United States Patent Office 3,793,348
Patented Feb. 19, 1974

3,793,348
EPOXIDES OF TRICYCLIC OLEFINIC
$C_{15}H_{24}$ HYDROCARBONS
Alan R. Hochstetler, Bloomfield, and Gary C. Kitchens, Wayne, N.J., assignors to Givaudan Corporation, Clifton, N.J.
No Drawing. Filed Mar. 20, 1972, Ser. No. 236,336
Int. Cl. C07d 1/12
U.S. Cl. 260—348 C    4 Claims

ABSTRACT OF THE DISCLOSURE

Certain tricyclic, olefinic $C_{15}H_{24}$ hydrocarbons derived from the strong acid isomerization of thujopsene are epoxidized to yield epoxides having valuable, amberlike odor, which are valuable in perfumery.

Field of the Invention

Novel odorant epoxides of tricyclic, olefinic $C_{15}H_{24}$ hydrocarbons derived from thujopsene.

Description of the Prior Art

Synthetic substitutes for ambergris are extremely sought after in the perfumery art; many such substitutes exist, but the search continues for readily available and inexpensive compounds having this odorant quality. Several compounds are known which possess a tricyclic, decahydronaphthalene skeleton and have an amber odor. However, the compounds contain either a tetrahydrofuran or a tetrahydropyran ring (see Stoll U.S. Pat. 3,029,225, Enninga and Beets, U.S. Pat. 3,045.028, Chodroff and Vazirani, U.S. Pat. 3,417,107 and Chem. and Ind. N.Z., 3, 4 (1967)). No compounds having the tricyclic decahydronaphthalene skeleton which contain an oxirane ring have heretofore been reported (in the designation of the number of rings tricyclic refers to the basic hydrocarbon skeleton; the presence of the oxirane ring would of course cause the product to be designated as a tetracyclic compound).

In co-pending applications, Ser. No. 107,498 now U.S. Pat. No. 3,681,470, entitled Acid Isomerization of Thujopsene and Novel Tricyclic, Olefinic $C_{15}H_{24}$ Hydrocarbons Formed Thereby, and Ser. No. 107,471, now U.S. Pat. No. 3,678,119, entitled Acid Isomerization of Chamigrenes, in which the inventors hereof together with Kent Kaiser are named as co-inventors, there are disclosed certain olefinic hydrocarbons designated therein as hydrocarbon A and hydrocarbon B. These hydrocarbons are two of the products produced by the strong acid isomerization of thujopsene. The hydrocarbon A is 7,8a-ethano-1,1,7-trimethyl-1,2,3,5,6,7,8,8a-octahydronaphthalene. The hydrocarbon B is 6,8a-ethano-1,1,6-trimethyl-1,2,3,5,6,7,8,8a-octahydronaphthalene. The mode of preparing hydrocarbons A and B is also disclosed in Journal of Organic Chemistry 37, 1 (1972).

SUMMARY OF THE INVENTION

Certain tricyclic, olefinic $S_{15}H_{24}$ hydrocarbons designated as hydrocarbons A and B and defined more completely hereinbelow, which are derived from the strong acid isomerization of thujopsene are epoxidized. The epoxidation may be carried out upon hydrocarbon A or hydrocarbon B separately, or upon a mixture of said hydrocarbons to yield respectively hydrocarbon A-epoxide, hydrocarbon B-epoxide or a mixture of said epoxides.

The epoxides either individually, or as mixtures, possess a powerful amber-like odor and are extremely useful as perfume materials in order to achieve woody amber notes in perfume or odorant compositions.

DESCRIPTION OF THE PREFERRED
EMBODIMENTS

The starting materials for the preparation of the novel epoxides in the present invention are prepared in accordance with any of the procedures set forth in copending applications Ser. Nos. 107,498, now U.S. Pat. No. 3,681,- 470 and 107,471, now U.S. Pat. No. 3,678,119. It has been found convenient to prepare these hydrocarbons by adding thujopsene to a mixture of glacial acetic acid and polyphosphoric acid at about 40° C. over a period of about 5 minutes, agitating the mixture at that temperature for a further time period suitably about 3 hours and quenching the reaction by pouring it into an excess of water. The water insoluble components are separated in the usual manner, washed free of acid and any solvents utilized in the extraction process, and distilled under reduced pressure. Gas liquid chromatography of the residue after removal of any extracting solvents indicates the presence of 8 components. Components 6 and 7 contain the desired hydrocarbons A nad B. It has been found convenient to isolate hydrocarbons A and B from the residue by distillation under reduced pressure utilizing a good fractionation column.

In view of the extremely close structural relationship of the products of the isomerization reaction, separation is difficult, and either refractionation of the fractions obtained under reduced pressure, or preparative vapor phase chromatography is desirably used in order to obtain pure hydrocarbons A and B.

However, where a fraction contains less than say, 5% of components other than hydrocarbons A or B, that fraction may be utilized without further purification.

In view of our finding that there is substantially no difference in the odorant properties of the epoxide derived from hydrocarbon A and the epoxide derived from hydrocarbon B, separation of hydrocarbon A from hydrocarbon B is not necessary prior to the epoxidation step.

The epoxidation of hydrocarbons A and B may be carried out by any mode of epoxidation known to the art. It is especially preferred, however, to utilize peracids as the epoxidizing agent. Any readily available peracid may be used, perphthalic, perbenzoic, meta-chloroperbenzoic or peracetic acid may be utilized. Peractic acid is the cheapest and most readily available peracid and it is preferred for that reason. However, where peractic acid is utilized in its commercial form, its content of approximately 1% sulfuric acid which is added as a stabilizer, must first be removed. This removal of sulfuric acid may be carried out by the addition of a basic salt such as for example, sodium acetate or sodium carbonate. It has been found preferable to utilize sodium carbonate as the neutralizing agent. There should be added to the peracid between 0.5 and 1 preferably about 0.75 mole of sodium carbonate per mole of hydrocarbon to be oxidized.

The general reaction conditions for the epoxidation step are not critical. It has, however, been found suitable to utilize approximately 1 equivalent of peracid per mole of hydrocarbon to be used. It is especially preferred to utilize a slight excess of peracid, say from about 0.05 to about 0.2 mole excess of peracid per mole of hydrocarbon. The temperature range at which the reaction is carried out is also not critical, a range of between 0° and 50° C. being operative. It has been found preferable, however, to turn the reaction at approximately 30° C.

The reaction can be carried out in the absence of additional solvents. However, we have found it preferable to carry out the reaction in a solvent medium, suitably a saturated hydrocarbon or halogenated hydrocarbon solvent for example, ethylene dichloride, or the like.

Where peracetic acid is utilized as the epoxidizing agent, it is necessary to pre-neutralize the acid.

It has been found acceptable to prepare a mixture of the solvent and hydrocarbons A and B, in anhydrous sodium carbonate, and, while agitating said mixture, adding thereto the peracetic acid.

After addition of the peracid is complete, the reaction is agitated, suitably from about 30 minutes to about 2 hours, suitably for about 1 hour, and the reaction mixture quenched by the addition thereto of water. The amount of water added is not, of course, critical. However, it has been found suitable to utilize a volume of water equivalent to about 1.3 of volumes of peracid used.

After agitation, the mixture is allowed to settle, the aqueous and organic phases separated, the aqueous phase extracted with the same solvent as used, if the reaction was run utilizing solvent, or else utilizing one of the suitable reaction solvents designated hereinabove, the organic phases combined, washed with water, aqueous inorganic base, such as sodium carbonate, and again with water and the solvent removed, preferably at atmospheric rather than reduced pressure.

The residual material is then distilled under reduced pressure suitably under a fractionating column, to yield the desired epoxide. Where a mixture of hydrocarbons A and B is utilized as starting material there will be produced a mixture of the epoxide or hydrocarbon A and the epoxide of hydrocarbon B and correspondingly where hydrocarbon A or hydrocarbon B are utilized as the sole starting material, the corresponding epoxides will be produced.

The epoxides have substantially the same type of odor; however, the epoxide of hydrocarbon B is substantially stronger than that of hydrocarbon A.

EXAMPLES

Instrumentation in the following examples is as follows:

(A) Vapor phase chromatography (vpc):
  A-1. 150° C., 60 ml./min., 15% carbowax 20 M on Chromosorb P, ¼" dia., 2 meter copper column.
  A-2. 225° C., 60 ml./min., 15% carbowax 20 M on chromosorb P, ¼" dia., 2 meter copper column.
(B) Vpc/mass spectrum:
  Perkin-Elmer 900, SCOT 3% carbowax 20 M, 0.02" dia., 50' stainless steel column Perkin-Elmer 270 (double focusing) on-line to a Varian 620/i.
(C) Infrared absorption (ir):
  Perkin-Elmer 457.
(D) Nuclear magnetic resonance (NMR)
  Varian A60A.
(E) Nester/Faust NFA–100 auto annular Teflon spinning band distillation column purchased from Nester/Faust Manufacturing Corp., Newark, Del.

EXAMPLE 1

Tricyclic $C_{15}H_{24}$ hydrocarbons rich in 6,8a-ethanol-1,1,6-trimethyl-1,2,3,5,6,7,8,8a-octahydronaphthalene and 7,8 - ethano - 1,1,7 - trimethyl - 1,2,3,5,6,7,8,8a-octahydronaththalene Into a reaction flask, equipped with an agitator, thermometer, feeding funnel and a condenser, is charged 500 g. glacial acetic acid and 200 g. polyphosphoric acid (115%). The mixture is agitated and 500 g. thujopsene is fed in at 40° C. over a 5-minute period. The batch is agitated at 40° C. for 3 hours and poured onto 1000 g. water. The oil layer is separated and the aqueous layer extracted 2× 100 ml. benzene. The combined oil and benzene extracts are washed 2× 50 ml. water, made alkaline with 10% sodium carbonate and washed neutral with salt water. The benzene is distilled off under reduced pressure leaving 505 g. crude hydrocarbons. Vpc (A-1) of the crude shows eight components: (1) 0.4%, (2) 1.3%, (3) 4.7%, (4) 4.9%, (5) 9.3%, (6) 27.3%, (7) 44.5%, (8) 7.5%. Components 1–4 are tricyclic $C_{15}H_{24}$ hydrocarbons of unknown structure. Component 5 is 2,2,37-tetramethyltricyclo[5.2.2.0$^{1,6}$]undec-3-ene. Components 6 and 7 are the desired tricyclic $C_{15}H_{24}$ hydrocarbons and are referred to as hydrocarbons A and hydrocarbons B. Component 8 is chamigrenes, principally α-chamigrene.

The crude is vacuum distilled at 0.5 mm. using a 2 ft., 25 mm. diameter Goodloe packed column (rated 14 theoretical plates) and a reflux ratio of 20:1 and the following fractions are collected:

(1) 66.0 g.; B.P. 51–65° C./0.5 mm.; $n_D^{20}$ 1.4980; vpc (A–1): 8.2% hydrocarbon A; 3.2% hydrocarbon B.
(2) 85.5 g.; B.P. 65–66° C./0.5 mm.: $n_D^{20}$ 1.5045; vpc (A–1): 35.4% hydrocarbon A, 21.6% hydrocarbon B.
(3) 262.4 g.; B.P. 66–76° C./0.5 mm.; $n_D^{20}$ 1.5075; sp. gr. 25° C./25° C. 0.9442; vpc (A–1): 32.9% hydrocarbon A; 59.7% hydrocarbon B; 3.3% α-chamigrene.
(4) 32.0 g.; B.P. 76–89° C./0.5 mm.; $n_D^{20}$ 1.5150; vpc (A–1): 24.6% hydrocarbon B, 47.2% α-chamigrene, 28.4% esters (acetates).
(5) 10.5 g.; B.P. 89–90/0.5 mm.; $n_D^{20}$ 1.5184; vpc (A–1): 10.6% β-chamigrene (VIII), 89.4% acetates.
(6) 35.1 g. residue.

The redistillation of fractions 1,2 and 4 will give more material similar to fraction 3, the desired products of the reaction.

Samples of hydrocarbons A and B are prepared from fraction 2 above by vacuum distillation @ 5 mm. using a Nester/Faust column ()E) and preparative vapor phase chromatography. The following is analytical data for the hydrocarbons:

Hydrocarbon A

Calcd. for $C_{15}H_{24}$ (percent): C, 88.16; H, 11.84. Found (percent): C, 88.24; H, 11.81.
Mass spectrum (B): 204 mol. wt. (31%), 189 (27%), 175 (100%), 161 (8%), 148 (18%), 147 (13%), 133 (20%), 119, (35%), 105 (39%), 95 (20%), 93 (16%), 91 (24%), 81 (18%), 79 (17%), 77 (15%), 69 (8%), 67 (11%), 65 (7%), 55 (16%), 53 (10%), 43 (7%), 41 (33%).
NMR (D) (τ, CDCl$_3$): centered at 4.75 (1H, broad, 1/2H=10 Hz., multiplet, vinylic), centered at 7.93 (2H, multiplet, allylic), centered at 8.08 (2H, multiplet, allylic), 8.25–8.92 (10H, multiplet, methylene), 9.00 (3H, singlet, methyl H), 9.13 (3H, singlet, methyl H), 9.17 (3H, singlet, methyl H);
IR (C) (ν, neat max.): 2930 (s), 2910 (s), 2850 (s), 1664 (w), 1550 (s), 1383 (m), 1372 (w), 1367 (m), 1258 (w), 1188 (w), 1102 (w), 1070 (w), 985 (w), 960 (w), 840 (m), 795 (w), 662 (w) cm.$^{-1}$.

Hydrocarbon B

Calcd. for $C_{15}H_{24}$ (percent): C, 88.16; H, 11.84. Found (percent): C, 88.07; H, 11.76.
Mass spectrum (B); 204 mol. wt. (42%), 189 (40%), 175 (100%), 161 (11%), 148 (25%), 147 (23%), 133 (25%), 119 (50%), 107 (17%), 105 (55%), 95 (25%), 93 (20%), 91 (29%), 81 (20%), 79 (20%), 77 (16%), 69 (9%), 67 (13%), 65 (9%), 55 (21%), 53 (11%), 43 (6%), 41 (34%).

NMR (D) ($\tau$, CDCl$_3$): centered at 4.72 (1H, broad, vinylic H), 8.04 (4H, broad multiplet, allylic H), 8.25–8.83 (10H, multiplet, methylene H), 9.19 (3H, singlet, methyl H), 9.21 (6 H singlet, methyl H).

IR (C) ($\nu$, neat, max.): 2945 (s), 2920 (s), 2865 (s), 1670 (w), 1458 (s), 1440 (m), 1385 (m), 1376 (m), 1365 (m), 1345 (w), 1135 (w), 1070 (w), 960 (w), 838 (w), 815 (w), 770 (w) cm.$^{-1}$.

EXAMPLE 2

Epoxyethanotrimethyldecahydronaphthalenes (hydrocarbon A-epoxide and hydrocarbon B-epoxide)

Into a reaction flask equipped with an agitator, thermometer, condenser and addition funnel is charged 260 g. (2.45 moles) of anhydrous sodium carbonate, 1, 120 g. (900 ml.) of ethylene dichloride and 612 g. (3 moles) of the hydrocarbons A and B. The mixture is vigorously agitated while 620 g. (3.28 moles) of 40% peracetic acid is fed in over a 1 hr. period as the temperature is maintained at 30° by cooling as necessary. The batch is agitated at 30° for 1 hr. after the peracetic acid addition is complete. Water (800 ml.) is added, agitated for 10 minutes and allowed to settle. The layers are separated and the aqueous phase is extracted once with 150 ml. of ethylene dichloride. The combined organic phases are washed with water (200 ml.), 10% sodium carbonate (200 ml.) and water (200 ml.). The ethylene dichloride solvent is removed under atmospheric pressure to a 120° pot temperature. The crude material (650 g.) is vacuum distilled at 0.5 mm. on a 37 cm. column packed with glass helices at a 1:1 reflux ratio and the following fractions collected:

(1) 184.0 g.; B.P. 75–92° C./0.5 mm.; $n_D^{20}$ 1.4815–1.4999.
(2) 412.0 g.; B.P. 92° C./0.5 mm.; $n_D^{20}$ 1.5010–1.5020.
(3) 13.3 g.; B.P. 92–95° C./0.5 mm.; $n_D^{20}$ 1.5025.
(4) 16.0 g.; B.P. 95–110° C./.5 mm.; $n_D^{20}$ 1.5075.
(5) 23.0 g.; residue.

Fraction 2 is the desired product of the reaction, a mixture of epoxides of hydrocarbons A and B. The redistillation of fractions 1 and 3 (197.3 g.) as above and increasing the reflux ratio to 5:1 gave an additional 141 g. of product, identical to fraction 2.

The following are the analytical data for the epoxides: $n_D^{20}$ 1.5015; sp. gr. 25° C./25° C. 1.0055; [$\alpha$]$_D^{25}$-2.8°, VPC (A-2) 40% hydrocarbon A epoxide, 60% hydrocarbon B epoxide.

Calcd. for C$_{15}$H$_{24}$O (percent): C, 81.76; H, 10.98. Found (percent): C, 81.91; H, 10.97.

NMR (D) ($\tau$, CDCl$_3$): 7.15–6.90 (1H, broad pattern), 9.26, 9.18, 9.16 (3H singlets from hydrocarbon B-epoxide), 8.95, 8.99, 9.20 (3H singlets from hydrocarbon A-epoxide).

IR (C) ($\nu$, neat, max.): 1162, 1070, 981, 958, 888, 879 cm.$^{-1}$.

EXAMPLE 3

4,4a-epoxy-7,8a-ethanol-1,1,7-trimethyldecahydronaphthalene (hydrocarbon A-epoxide)

A solution of 9.5 g. (46 mmol) of 85% m-chloroperbenzoic acid in 135 ml. of benzene is cooled to 10° and agitated while 8.2 g. (40 mmol) of Hydrocarbon A is added over 5 min. The mixture is allowed to stir at 10° for 1.0 hr. at 25° for 0.5 hr., then is treated with 50 ml. of 10% aqueous sodium hydroxide. The organic phase is removed, washed with water and the solvent is removed under reduced pressure. The residual oil is distilled affording 8.1 g. of the desired epoxide, B.P. 90–95° at 0.3 mm., $n_D^{20}$ 1.5002, identical to the minor epoxide of Example 2 above.

Calcd. for C$_{15}$H$_{24}$O (percent): C, 81.76; H, 10.98. Found (percent): C, 81.63; H, 11.08.

IR (C) ($\nu$, neat max): 1195, 1162, 981, 950, 879 cm.$^{-1}$.

NMR (D) ($\tau$, CDCl$_3$): 7.14–7.00 (1H, broad pattern), 8.95 3H, singlet), 8.99 (3H, singlet), 9.20 (3H, singlet).

Mass spectrum (B): 220 (48%), 191 (43%), 159 (39%), 135 (39%), 121 (53%), 119 (40%), 107 (62%), 105 55 (75%), 43 (71%), 41 (100%).

EXAMPLE 4

4,4a-epoxy - 6,8a-ethano - 1,1,6-trimethyldecahydronaphthalene (hydrocarbon B-epoxide)

A solution of 7.2 g. (35 mmol) of 85% m-chloroperbenzoic acid in 115 ml. of benzene is cooled at 10° and agitated while 6.1 g. (30 mmol) of hydrocarbon B is added over 5 min. The mixture is allowed to agitate at 10° for 1.0 hr. and at 25° for 0.5 hr. then is treated with 50 ml. of 10% aqueous sodium hydroxide. The organic phase is separated, washed with water, and the solvent removed under reduced pressure. The residue oil is distilled affording 6.0 g. of the desired epoxide, B.P. 105–110° at 0.7 mm.; $n_D^{20}$ 1.5015, identical to the major epoxide of Example 2 above.

Calcd. for C$_{15}$H$_{24}$O (percent): C, 81.76; H, 10.98. Found (percent): C, 81.78; H, 11.16.

IR (C) ($\nu$, neat max): 1140, 1065, 1000, 980, 888, 859, 738 cm.$^{-1}$

NMR (D) ($\tau$, CDCl$_3$): 7.15–6.90 (1H, broad pattern), 9.16 (3H, singlet), 9.18 (3H, singlet), 9.26 (3H, singlet).

Mass spectrum (B): 220 (19%), 202 (30%), 177 (40%), 159 (39%), 133 (35%), 131 (35%), 121 (61%), 119 (50%), 107 (76%), 105 (72%), 95 70%), 93 (77%), 91 (61%), 81 (57%), 79 (56%), 55 (72%), 43 (98%), 41 (100%).

EXAMPLE 5

Odor evaluations and comparisons

The following materials were evaluated:

(1) 4,4a-epoxy-7,8a-ethano-1,1,7-trimethyldecahydronophthalene (hydrocarbon A-epoxide), Example 3.
(2) 4,4a-epoxy-6,8a-ethano-1,1,6-trimethyldecahydronaphthalene (hydrocarbon B-epoxide), Example 4.
(3) Hydrocarbon A-epoxide (40%) and hydrocarbon B-epoxide (60%) mixture, Example 2.
(4) Ambergris.

All evaluations were made by applying 0.2 ml. of each material on smelling blotters and observing its odor. The intensity studies were carried out by evaluating a series of dilutions in ethanol of materials 1 to 3 and comparing them with a standard solution in ethanol of ambergris, material 4.

Material 1, pure hydrocarbon A-epoxide, has a strong amber camphoraceous odor reminiscent of the odor of ambergris. It is however twice as strong as ambergris, material 4.

Material 2, pure hydrocarbon B-epoxide has an extremely powerful amber-woody odor which is quite close to the volatile amber note of ambergris. It is approximately five times stronger than ambergris, material 4.

Material 3, a 40:60 mixture of the epoxides of hydrocarbons A and B, have an extremely powerful amber-woody odor which is quite similar to that of material 2. The presence of 40% of material 1 does not change the effective odor of material 2 since the odor of material 1 supports that of material 2. Material 3 is approximately five times as strong as ambergris, material 4.

EXAMPLES 6–10

Examples of odorant compositions

A fragrance base (Example 6) is prepared using the ingredients listed in Example 6. The materials 1 to 4 of Example 5 are compounded into the fragrance base of Example 6 to give the fragrances of Examples 7 to 10.

The odor characteristics of the fragrances are studied and compared by applying 10 ml. of 10% ethanolic solutions of the fragrances to smelling blotters and observing the odor while allowing the fragrances to evaporate at room temperature.

The fragrance of Example 7 has a fresh amber note and more body and warmth than that exhibited by the fragrance of Example 6 which lacks material 1. The amber nuance demonstrated in Example 7 is quite similar to that of Example 10 wherein ambergris (material 4) itself is used at twice the concentration of material 1.

The fragrance of Example 8 possesses a very fine amber note and more body and warmth than that afforded by the fragrance of Example 6 which lacks material 2. The amber nuance demonstrated in Example 8 is quite similar to that of Example 10 wherein ambergris (material 4) itself is employed at five times the concentration of material 2.

The fragrance of Example 9 is virtually identical to that of Example 8. The odor qualities of material 3 in this formulation do not differ from that wherein pure material 2 (Example 8) is employed since the presence of 40% of material 1 in material 3 supports the odor of the material 2 contained therein. The amber nuance demonstrated in Example 9 is quite similar to that of Example 10 wherein ambergris (material 4) itself is employed at a concentration five times greater than that of material 3.

The normal concentration range of materials 1 to 3 is from 0.05% to 10% in fragrances. Larger amounts may also be used depending upon the type of fragrance and the specific effect desired.

Materials 1 to 3 are therefore fine odorants and valuable perfume materials and can be used to improve and render more desirable many types of fragrances. These materials are novel and possess a natural ambergris odor but are more powerful and less expensive than ambergris.

| Example | 6 | 7 | 8 | 9 | 10 |
|---|---|---|---|---|---|
| Aldehyde C-16 pure | 1 | 1 | 1 | 1 | 1 |
| Benzyl acetate | 38 | 38 | 38 | 38 | 38 |
| Benzyl salicylate | 125 | 125 | 125 | 125 | 125 |
| Cedryl acetate | 63 | 63 | 63 | 63 | 63 |
| Citronellol | 34 | 34 | 34 | 34 | 34 |
| Citronellyl formate | 13 | 13 | 13 | 13 | 13 |
| Diethyl phthalate | 165 | 150 | 159 | 159 | 135 |
| Geranyl acetate | 15 | 15 | 15 | 15 | 15 |
| Laurine extra ®[1] | 97 | 97 | 97 | 97 | 97 |
| Lemon oil | 13 | 13 | 13 | 13 | 13 |
| Linalool | 38 | 38 | 38 | 38 | 38 |
| Linalyl acetate | 84 | 84 | 84 | 84 | 84 |
| Methylionone γ | 40 | 40 | 40 | 40 | 40 |
| Musk ambrette | 13 | 13 | 13 | 13 | 13 |
| Musk ketone | 13 | 13 | 13 | 13 | 13 |
| Oak Moss resin | 6 | 6 | 6 | 6 | 6 |
| Patchouli oil | 6 | 6 | 6 | 6 | 6 |
| Phenylethyl alcohol | 180 | 180 | 180 | 180 | 180 |
| Sandela ®[2] | 38 | 38 | 38 | 38 | 38 |
| Vanillin, 10% | 5 | 5 | 5 | 5 | 5 |
| Vetiver oil | 13 | 13 | 13 | 13 | 13 |
| Material: | | | | | |
| 1 (H/C—A—epoxide) | | 15 | | | |
| 2 (H/C—B—epoxide) | | | 6 | | |
| 3 (H/C—A + H/C—epoxide) | | | | 6 | |
| 4 (Ambergris) | | | | | 30 |
| Total | 1,000 | 1,000 | 1,000 | 1,000 | 1,000 |

[1] Registered trademark of Givaudan Corp. for Hydroxy Citronellal.
[2] Registered trademark of Givaudan Corp. for Isocamphyl Cyclohexanol.

Note.—H/C=hydrocarbon.

What is claimed is:

1. A number of the group consisting of at least one compound selected from the group consisting of 4,4a-epoxy-6,8a-ethano-1,1,6-trimethyl - decahydronaphthalene and 4,4a-epoxy-7,8a-ethano - 1,1,7 - trimethyl-decahydronaphthalene.

2. Compounds in accordance with claim 1, consisting of a mixture of 4,4a-epoxy-6,8a-ethano-1,1,6-trimethyl-decahydronaphthalene and 4,4a-epoxy-7,8a-ethano-1,1,7-trimethyl-decahydronaphthalene, said mixture having the emperical formula, $C_{15}H_{24}O$, B.P. of 92° C./0.5 mm. and $n_D^{20}$ —1.5010–1.5020.

3. 4,4a-epoxy-6,8a-ethano - 1,1,6 - trimethyldecahydronaphthalene.

4. 4,4a-epoxy-7,8a-ethano - 1,1,7 - trimethyldecahydronaphthalene.

No references cited.

NORMA S. MILESTONE, Primary Examiner

U.S. Cl. X.R.

525—522; 260—666 PY

UNITED STATES PATENT OFFICE
CERTIFICATE OF CORRECTION

Patent No. 3,793,348           Dated February 19, 1974

Inventor(s) Alan R. Hochstetler et al.

It is certified that error appears in the above-identified patent and that said Letters Patent are hereby corrected as shown below:

1. Column 1, line 62: change $S_{15}H_{24}$ to $C_{15}H_{24}$.

2. Column 2, line 29: change nad to and.

3. Column 2, line 54: change peractic to peracetic.

4. Column 3, line 7: change turn to run.

5. Column 3, line 69: change ethanol to ethano.

6. Column 3, line 72: read dronaphthalene.

7. Column 5, line 65: change ethanol to ethano.

8. Column 8, line 18: in table, change H/C-epoxide to H/C-B epoxide.

9. Column 8, line 36: change emperical to empirical.

Signed and sealed this 8th day of April 1975.

(SEAL)
Attest:

RUTH C. MASON
Attesting Officer

C. MARSHALL DANN
Commissioner of Patents
and Trademarks